Patented Aug. 25, 1936

2,052,417

UNITED STATES PATENT OFFICE 2,052,417

MANUFACTURE OF SODIUM CYANIDE

Ernest C. Moffett, Woodbridge, N. J., assignor to American Cyanamid Company, New York, N. Y., a corporation of Maine No Drawing. Application January 13, 1934, Serial No. 706,538

13 Claims. (Cl. 23—79)

This invention relates to the production of cyanides more particularly to the cyanides of the alkali metals, such as sodium cyanide.

Processes have been known and used for the production of alkali metal cyanides, such processes being capable of the producing a satisfactory grade of sodium cyanide, for example, but they are subject to certain disadvantages such as the necessity for accurate and constant supervision and control of the process, the relatively high cost of raw materials and the generally complicated character of the operation itself.

There has also been known a method of producing alkali earth metal cyanides, such as calcium cyanide, by a cheap and effective procedure. This process consists essentially in providing a mixture of calcium cyanamid and sodium chloride, for example, fusing the same and rapidly chilling the product, which contains a relatively large proportion of calcium cyanide. This process has a number of advantages in that it is a simple operation, which is readily carried out and the product is continuously produced. It does not require skilled workmen and the process is simple and effective.

The present invention is intended to provide a method of making alkali metal cyanides by a simple, cheap and effective process whereby the cost thereof will be greatly reduced over the old process previously utilized for the production of alkali metal cyanides. The present invention is also intended to utilize as a raw material the calcium cyanide obtained from the process above mentioned.

The new method consists essentially in first providing an alkali earth metal cyanide, such as calcium cyanide, and contacting the same with an alkali metal salt of an acid which is capable of forming an insoluble alkali earth metal salt upon a reaction taking place between said compounds. The ingredients are heated to a sufficiently high temperature, which is generally above the melting point of one or both of the ingredients, and the mixing of the molten materials causes the desired reaction to take place. In said reaction the alkali metal replaces the alkali earth metal in the cyanide and the alkali earth metal combines with the acid radical forming an insoluble compound.

The following is a more specific description of the operation of the new method. A mixture is made of a crude calcium cyanamid and sodium chloride in the proportion of about two parts of calcium cyanamid to one part of sodium chloride. The mixture is heated in a furnace to cause fusion to take place, whereby a reaction occurs between the calcium cyanamid and the free carbon which is present in the cyanamid whereby it is transformed into calcium cyanide. The sodium chloride is a flux which assists in the conversion of the calcium cyanamid into cyanide and provides a free flowing mixture, which is tapped from the furnace and rapidly cooled. The resulting product is essentially a mixture of calcium cyanide, sodium chloride and varying quantities of minor impurities such as lime, carbon and the like.

200 parts of a 46% calcium cyanide made as above described may now be mixed with about 120 parts of sodium carbonate, for example, and the mixture heated in a suitable furnace to a temperature which may be above the melting point of one or both of the ingredients, whereby a reaction takes place as follows:

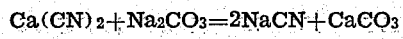

$$Ca(CN)_2 + Na_2CO_3 = 2NaCN + CaCO_3$$

As a result there is formed sodium cyanide, usually in the molten state, mixed with molten sodium chloride, and the mixture contains in addition insoluble solid calcium carbonate and/or oxide and other impurities of minor character. The molten mixture of sodium cyanide and sodium chloride may be separated from the insoluble impurities in various ways. For example, the molten mixture may be allowed to remain quiet for a sufficient length of time and held at a sufficiently high temperature to allow the insoluble solid impurities to settle to the bottom, after which the molten material may be decanted or it may be filtered and then worked into the desired form.

The separated sodium cyanide composition may then be treated to extract its cyanide content, or instead of separating the insoluble material from the molten portion I may cool the entire mass and grind the same to a suitable degree of fineness. In either case I extract the sodium cyanide so as to free it from not only the insoluble matter, but also from substantially all of the sodium chloride, or other like salts. This may be done in various ways, but more particularly as described in my co-pending application Serial No. 711,659, filed February 17, 1934 and entitled Manufacture of sodium cyanide. As set forth in said application I utilize substantially anhydrous methyl alcohol, containing a small amount of anhydrous ammonia, as a solvent. This mixture has the property of dissolving a relatively large proportion of sodium cyanide while dissolving substantially none of the other compounds contained in the mixture. The solution is filtered and the solvent is evaporated and recovered, leaving behind it a substantially pure high grade sodium cyanide.

While I have above described a single specific example of the method of producing sodium cyanide, it is, of course, apparent that my invention is not limited to the making merely of sodium cyanide but other cyanides of similar character, including all of the alkali metal cyanides, may of course, be made in the same manner. I have given above several methods of separation and of purification of the sodium cyanide produced by the present invention and such methods are to be considered as illustrating a large variety of methods which may be used in the treatment of such cyanides.

In the description I have set forth a process in which the alkali earth metal cyanide in the solid state is mixed with the alkali metal salt also in the solid state and the mixture is fused. This exact procedure is not essential to the operation of my new method, as it is possible to use variations thereof with good results. In some cases it is not necessary to melt the materials as heating to incipient fusion or even to such a point that sintering begins, will be found sufficient to give the desired reaction, particularly if the ingredients are finely divided and intimately mixed. In the alternative I may melt one of the ingredients and gradually mix with the same the other ingredient in solid form, thereby causing a gradual reaction with the formation of the alkali metal cyanides. As another alternative I may melt both of the constituents and mix the two melts to give a molten product.

Or I may tap the molten calcium cyanide from the furnace as described above and mix the same while it is flowing from the furnace, with the alkali metal salt either in the molten or in the solid state, causing the reaction to take place immediately and to be completed prior to the cooling and solidification of the resulting product. The molten mixture may be caused to contact with the cooled surface of a rotating drum to solidify the same, after which it is scraped from the drum in the form of flakes.

In place of the sodium carbonate, which I have given above as an example of an alkali metal salt suitable for the process, I may use salts of other alkali metals and the acid radical may be of a suitable character, to give an insoluble calcium compound in the resulting melt.

From the above it will be apparent to those skilled in the art that the invention described above is capable of wide variation with good results. Therefore, the invention is to be broadly construed and is to be limited only by the scope of the claims appended hereto.

What I claim is:

1. A method of producing alkali metal cyanides which comprises providing molten calcium cyanide, contacting the same with molten alkali metal carbonate to cause a reaction to take place and separating the resulting alkali metal cyanide from the solid reaction product without materially lowering the temperature.

2. A method of producing alkali metal cyanides which comprises providing molten calcium cyanide, contacting the same with molten sodium carbonate to cause a reaction to take place and separating the resulting sodium cyanide from the solid reaction product without materially lowering the temperature.

3. A method of producing alkali metal cyanides which comprises providing a molten mixture of calcium cyanide and sodium chloride, and contacting the same with molten sodium carbonate to cause a reaction to take place.

4. A method of producing alkali metal cyanides which comprises producing molten calcium cyanide, pouring the same, adding to the stream of calcium cyanide a stream of molten alkali metal salt of an acid capable of forming an insoluble calcium salt to cause a reaction to take place, and solidifying the mixture.

5. A method of producing alkali metal cyanides which comprises producing molten calcium cyanide, pouring the same, adding to the stream of calcium cyanide a stream of molten sodium carbonate to cause a reaction to take place, and solidifying the mixture.

6. A method of producing alkali metal cyanides which comprises producing molten calcium cyanide, pouring the same, adding to the stream of calcium cyanide a stream of molten alkali metal salt of an acid capable of forming an insoluble calcium salt to cause a reaction to take place, and solidifying the mixture by contacting the same with a cooled flaking drum.

7. A method of producing alkali metal cyanides which comprises producing molten calcium cyanide, pouring the same, adding to the stream of calcium cyanide a stream of molten sodium carbonate to cause a reaction to take place, and solidifying the mixture by contacting the same with a cooled flaking drum.

8. A method of making alkaline metal cyanide which includes the steps of reacting an alkaline earth metal cyanide with an alkali metal salt of an acid capable of forming an insoluble alkaline earth metal salt, in a liquid melt, and separating the insoluble solid alkaline earth metal salt from the molten alkali metal cyanide.

9. The method of claim 8 in which the alkaline earth metal is calcium.

10. The method of claim 8 in which the acid is carbonic.

11. The method of claim 8 in which the alkaline earth metal is calcium and the acid is carbonic.

12. The method of claim 8 in which the melt is maintained as a quiescent liquid for a sufficiently long time to permit the solids to settle and then decanting the supernatant molten alkali cyanide.

13. A method of making sodium cyanide which includes the steps of fusing a mixture of alkaline earth metal cyanide and an alkali salt of an acid capable of forming an insoluble alkaline earth metal salt, and separating the insoluble solid alkaline earth metal salt from the molten sodium cyanide.

ERNEST C. MOFFETT.